Dec. 8, 1959    A. L. BOEKENKAMP    2,916,063
MATERIAL GUIDE DEVICE
Filed March 6, 1956
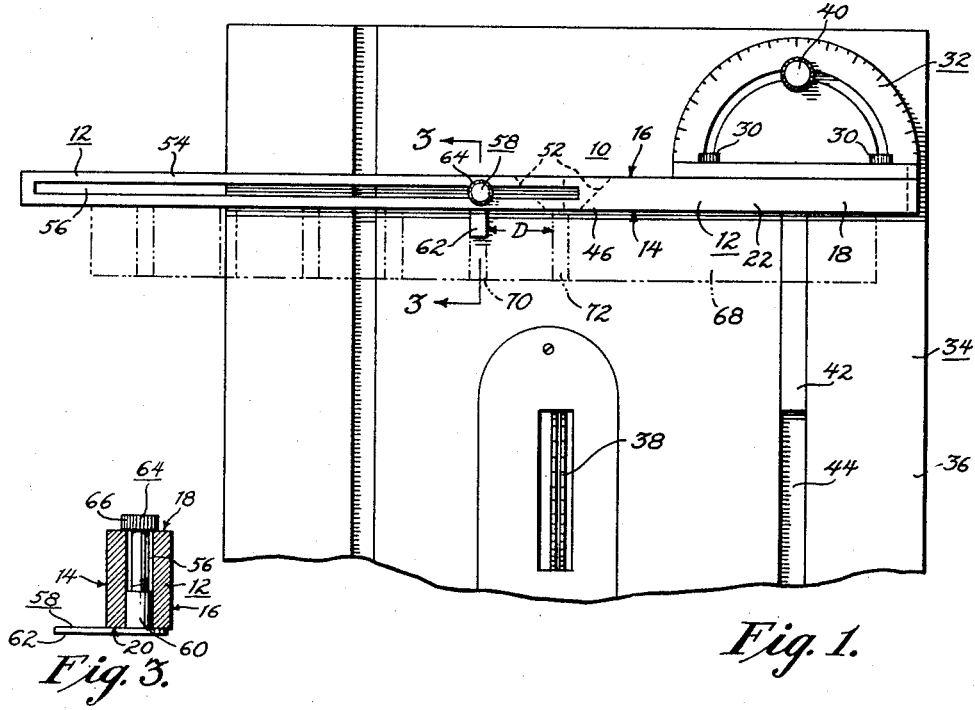
Fig. 1.
Fig. 3.
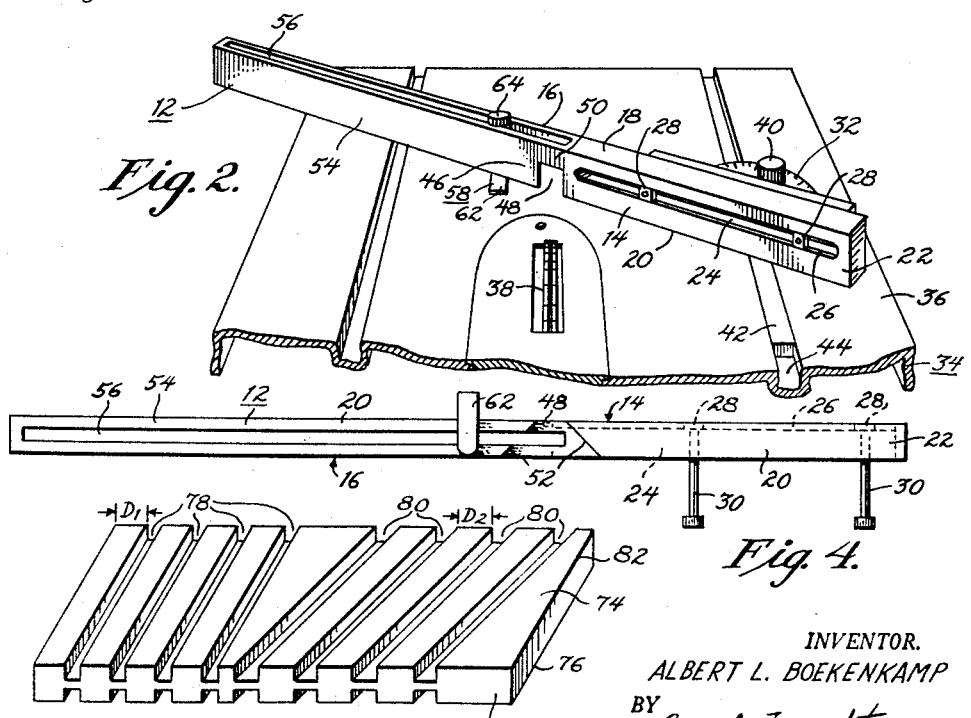
Fig. 2.
Fig. 4.
Fig. 5.
INVENTOR.
ALBERT L. BOEKENKAMP
BY
Jacob Trachtman
ATTORNEY.

United States Patent Office 2,916,063
Patented Dec. 8, 1959

2,916,063
MATERIAL GUIDE DEVICE
Albert L. Boekenkamp, Philadelphia, Pa.
Application March 6, 1956, Serial No. 569,936
7 Claims. (Cl. 144—136)

The invention relates to a material guide device, and more particularly to a material guide device for use with a saw table.

Heretofore, saw tables have been utilized to provide grooves in a workpiece. However, such saw tables have not been provided with material guide means for easily and accurately producing a plurality of parallel and equally spaced grooves in a workpiece. Nor has guide means been provided which readily provides for the adjustment of the space between the grooves and allows the formation of grooves on any desired angle or bias.

It is therefore a primary object of the invention to provide a new and improved material guide device for use in connection with a saw table.

Another object of the invention is to provide a new and improved material guide device adapted for connection on a saw table for efficiently producing a plurality of parallel and equally spaced grooves in a workpiece of any adjusted angle or bias.

Another object of the invention is to provide a new and improved material guide device adapted for forming in a workpiece a plurality of parallel equally spaced grooves of any desired width.

Another object of the invention is to provide a new and improved material guide device with means for engaging an index groove in a workpiece for forming a plurality of parallel equally spaced grooves in the workpiece.

Another object of the invention is to provide a new and improved material guide device which is adapted for attachment with a sliding miter gauge of a saw table and is provided with an adjustable and interchangeable key element adapted for engaging successively the grooves formed in the workpiece for producing a plurality of parallel and equally spaced grooves in the workpiece.

Another object of the invention is to provide a new and improved material guide device which is relatively inexpensive to manufacture, is simple in operation, and is highly durable and adaptable for various operations.

The above objects of the invention are achieved by providing a material guide device comprising a bar member having a first end portion adapted for being secured with the miter gauge of the saw table, an intermediate portion provided with a blade clearing opening, and a second end portion. A key element is secured and adjustably positioned along the second end portion of the bar member and is provided with an extending portion. The extending portion of the key element is adapted for engaging an index groove in a workpiece for forming a second groove which is parallel to the first groove and spaced a predetermined distance therefrom. The extending portion of the key element of the guide device may then be received in the groove thus formed to provide another groove which is equally spaced and parallel to the groove just previously formed. An entire series of parallel equally spaced grooves may be formed in this manner.

By adjusting the angle of the miter gauge and the angular orientation of the key element to correspond therewith, the work material may be provided with a plurality of equally spaced parallel grooves on the bias determined by the angle of miter gauge.

The foregoing and other objects of the invention will become more apparent as the following detailed description of the invention is read in conjunction with the drawings, in which:

Figure 1 is a plan view showing a material guide device embodying the invention as attached with a miter gauge of a saw table, Figure 2 is a perspective view of Figure 1 with the material guide device positioned at an angle by the miter gauge for forming grooves on a bias in a work material, Figure 3 is an enlarged detailed view of the key element taken on the line 3—3 of Figure 1, Figure 4 is an inverted plan view of the material guide device shown in Figure 1, and Figure 5 is a workpiece formed with grooves produced by utilizing the material guide device illustrated herein.

Like reference numerals designated like parts throughout the several views.

Refer now to the figures for a description of the material guide device embodying the invention.

The material guide device 10 comprises a bar member 12 of substantially rectangular cross-section which may be made of aluminum or any other suitable material. The bar member 12 has front and rear vertical side walls 14 and 16 and horizontal top and bottom surfaces 18 and 20.

The first end 22 of the bar member 12 is provided with a horizontal slot 24 extending along the bar member 12 through the front and rear walls 14 and 16.

The slot 24 in the portion 22 of the bar member 12 is provided with a recess 26 at the front side wall portion 14 for slidably receiving a pair of square retaining nuts 28. The recess 26 prevents rotation of the square nuts 28 and facilitates their threaded engagement with a pair of attaching bolts 30 which extend through the slot 24 of the bar member 12. The bolts 30 and retaining nuts 28 may be tightened to secure the bar member 12 with a miter gauge 32 of a saw table 34. The bolts 30 may be loosened to allow slide action of the retaining nuts 28 along the slot 24, for adjusting the position of the bar member 12 in the horizontal direction along its length.

When thus secured, the bar member 12 extends across the top surface 36 of the saw table 34. The angle of the bar member 12 with respect to the saw blades 38 of the table 34 may be adjusted in the usual manner by releasing the clamping bolt 40 of the miter gauge 38. When the angle has been adjusted the clamping bolt 40 may be tightened to secure the bar member 12 in the desired angular position.

The miter gauge 32 is provided with a guide bar 42 which is received in a slot 44 in the table 34. This allows motion of the miter gauge 32 and the attached bar member 12 in a direction parallel to the cutting action of the blades 38.

The intermediate portion 46 of the bar member 12 is provided with an opening 48 extending from the bottom surface 20 of the member 12 and leaving a top connecting portion 50. The opening 48 provides a clearance for the saw blades 38 of the table 34 when the bar member 12 moves over the saw blades 38 in the traversing action of the miter gauge 32. The opening 48 may be provided with inclined wall portions 52 (see Figures 1 and 4) to accommodate for the angular adjustment of the miter gauge 32. In attaching the bar member 12 to the miter gauge 32, the horizontal position of the bar member 12 is adjusted so that the saw blades 38 will clear through the opening 48 of the bar member.

The second end portion 54 of the bar member 12 is provided with a vertical slot 56 extending along the bar member 12 through its top and bottom surfaces 18 and 20.

The Figure 3 shows in detail a key element 58 comprising a cylindrical portion 60 having a central threaded opening being attached at its bottom to a substantially flat and rectangular extending portion 62, and a clamp bolt 64.

The cylindrical portion 60 of the key element 58 is received into the slot 56 through the bottom surface 20 of the second end portion 54 of the bar member 12. The cylindrical portion 60 extends in the vertical direction while the extending tab portion 62 is substantially horizontal contacting the bottom surface 20 and projecting beyond the front wall 14 of the bar member 12. The clamping bolt 64 extends vertically into the slot 56 with its end threadably engaging the opening in the cylindrical portion 60 of the key element 58, while its head 66 engages the top surface 18 of the bar member 12.

By loosening the screw element 64, the key element 58 may be moved within the groove 56 to any desired position along the second end portion 54 of the bar member 12. The extending tab portion 62 of the key element 58 may also be turned to any desired angular position with respect to the bar member 12.

Refer now to Figure 1 for a description of the manner in which the material guide device 10 is used to produce a plurality of parallel equally spaced grooves in a workpiece 68. The workpiece is represented by the dashed lines of Figure 1. The bar member 12 is first attached to the miter gauge 32 in the manner described. The miter gauge 32 is positioned to the angle or bias at which the grooves are to be formed in the workpiece 68. The first groove in the workpiece 68 may now be formed by positioning the workpiece 68 along the bar member 12 so that when the miter gauge 32 guides the material guide device over the saw blades 38, the first groove will be formed in the position desired and at the set bias.

The key element 58 may now be positioned along the second end portion 54 of the bar member 12 to determine the distance D between the proximate edges of adjacent parallel grooves which are to be formed in the workpiece 68. It is noted that in moving the key element 58 in the direction away from the central portion 46 of the bar member 12, the distance D increases. In this manner, the distance D between the parallel adjacent grooves may be adjusted.

When the bar member 12 is positioned on a bias angle as shown in Figure 2, the extending tab portion 62 of the key element 58 may be turned to the direction of the groove in the work material 68. This direction is parallel to the direction of the guide groove 44 in the table 34. A key element 58 utilized has an extending tab portion 62 with a width corresponding to the width of the grooves formed in the work material 68 by the saw blades 38. Of course, the key element 58 is readily replaced with a corresponding key element 58 for the particular width of the groove to be formed.

The work material 68 which may be a block of wood or any other formable material, is positioned along the front wall 14 of the bar member 12 with the tab portion 62, for example, received within the formed groove 70 which acts as an index groove. A sawing operation is now performed by a traverse of the material 68 over the saw blades 38 by the movement of the miter gauge 32 and guide bar 12. This forms a groove 72 in the material 68. The groove 72 is parallel to the index groove 70 and spaced therefrom a distance D.

By now using the groove 72 thus formed as an index groove receiving the tab 62 of the key element 58, another groove is formed in the material 68 which is parallel to the grooves 70 and 72 spaced a distance D from the groove 72. By a continuation of this process, a series of parallel grooves which are equally spaced from adjacent grooves by a distance D may be formed in the material 72. Of course, the material may be provided with a second set of grooves having an angular bias and separation distance D provided by readjusting the key element 58 of the material guide device 10 and proceeding in a similar manner.

Refer to Figure 5 which discloses a workpiece or board 68' having a plurality of grooves formed in its top surface 74 as well as in its bottom surface 76. One set of grooves 78 which are parallel and equally spaced by a distance $D_1$ were formed in the top surface 74, as well as a second set of grooves 80 which were also formed by the invention in the manner described. The grooves 80, however, are on a bias to the edge 82 of the work material 68' and have adjacent grooves 80 spaced a distance $D_2$.

Of course, it will be evident that a plurality of sets of grooves each with a selected bias may be formed in the material, with said sets of grooves running parallel to each other, at a bias to each other or intersecting grooves of the other sets.

The many advantages, such as the versatility and adaptability of the material guide device will be evident to those skilled in the woodworking and fabricating arts.

It will, of course, be understood that the description and drawings contained herein, are illustrative merely and that various modifications and changes may be made in the structure disclosed without departing from the spirit of the invention.

What is claimed is:

1. A material guide device for use with a saw table comprising a bar member with front and rear walls and horizontal top and bottom surfaces having a first end portion, with means guiding said bar member for movement relative to a saw blade, an intermediate portion provided with an opening for clearing the saw blade of said table, and a second end portion; and a key element secured with and adjustably positioned along the second end portion of said bar member and having a substantially rectangular portion extending beyond the front wall and contacting the bottom surface of said bar member for engaging and being received within a first groove in a workpiece for positioning said workpiece relative to said saw blade for forming a second groove in said workpiece at a predetermined distance from said first groove.

2. A material guide device for use with a saw table comprising a bar member of rectangular cross-section having vertical side walls, and horizontal top and bottom surfaces; said bar member having a first end portion with means positioning said bar member for movement relative to a saw blade, an intermediate portion provided with an opening for clearing the saw blade of said table, and a second end portion; the second end portion of said bar member being provided with a vertical key slot extending along said bar member through its top and bottom surfaces; and a key element having a cylindrical vertical portion received through the key slot of said bar member, a clamp bolt threadedly engaging said cylindrical portion for being adjustably positioned along the second end portion of said bar member, and a tab portion connected with said cylindrical portion and rotatable about the vertical cylindrical axis.

3. A material guide device for use with a saw table for forming spaced grooves in a workpiece comprising a bar member of rectangular cross-section having front and rear vertical side walls, and horizontal top and bottom surfaces; said bar member having a first end portion with means positioning said bar member for movement relative to a saw blade, an intermediate portion provided with an opening for clearing the saw blade of said table, and a second end portion; the second end portion of said bar member being provided with a vertical key slot extending along said bar through its top and bottom surfaces; and a key element having a portion slidably received in the key slot of said bar member, a tab portion extending beyond the front vertical side wall of said bar member along and contacting its bottom surface, and means for clamping said key element at an adjustable position along the second end portion of said bar member; the tab portion of said key element being adapted to engage an index groove of a workpiece; said key element being positionable along said bar member for controlling the distance between said index groove and the groove to be formed in said workpiece.

4. A material guide device for use with a saw table for forming a plurality of equally spaced parallel grooves of any bias in a workpiece comprising a bar member of rectangular cross-section having front and rear vertical side walls and horizontal top and bottom surfaces; said bar member having a first end portion with means positioning said bar member for movement relative to a saw blade, an intermediate portion provided with an opening for clearing the saw blade of said table, and a second end portion; the second end portion of said bar member being provided with a vertical key slot extending along said bar through its top and bottom surfaces; and a key element having a cylindrical vertical portion with a threaded central opening slidably received in the key slot of said bar, and secured at its bottom with a substantially rectangular portion extending beyond the front wall of said bar member in the direction along and contacting the bottom surface of said member, and a clamping bolt vertically extending into the key slot with its head engaging the top surface of said bar member and its end threadedly received by the opening of said cylindrical portion; the tab portion of said key element being adapted to sequentially engage a plurality of indexing grooves for forming a plurality of equally spaced parallel grooves of any bias; the tab portion of said key element being angularly adjustable to the bias of an index groove in a workpiece and adapted for receipt within said index groove; said key element being positionable along said bar member for controlling the distance between said index groove and the groove to be formed in said workpiece.

5. A material guide device comprising a bar member having a front wall, miter gauge guide means at one end of said bar member positioning said bar member for movement along a predetermined path relative to a saw blade, a key guide element adjustably carried upon the opposite end of said bar member for selective movement lengthwise along said bar member and having an elongated portion projecting forwardly beyond said front wall of said bar member, said elongated portion having a directional axis parallel to said predetermined path of movement of said bar member intersecting the longitudinal axis of said bar member, and means for selectively adjusting the angular position of said elongated portion relative to said bar member to vary the angular relationship between said directional axis of said elongated portion and said longitudinal axis of said bar member, and said bar member intermediate said one end and said opposite end defining a blade clearance opening accommodating the saw blade in spaced relationship therewithin during movement of said bar member relative to said saw blade.

6. A material guide device for use with a saw table to form a workpiece with a plurality of grooves comprising a bar member having a front wall for abutment with a workpiece and having a first end portion with means thereon guiding said bar member for movement relative to a saw blade, said bar member having a bottom surface with an intermediate portion provided with an opening for clearing the saw blade of said table, and a second end portion; and a key element secured within and adjustably positioned along the second end portion of said bar member and having a substantially rectangular tab portion extending beyond the front wall of said member for engaging and being received within a first groove in a workpiece for positioning said workpiece along said bar member for forming a second groove in said workpiece at a predetermined distance from said first groove; the extending portion of said key element extending in the direction along and contacting the bottom surface of said member; the tab portion of said key element adapted to engage said second groove formed in said workpiece for repositioning said workpiece along said bar member for forming a third groove at a predetermined distance from said second groove.

7. A material guide device for use with a saw table to form a workpiece with a plurality of parallel equally spaced grooves of any bias comprising a bar member having guide means on a front end portion positioning said bar member for movement along a predetermined path relative to a saw blade, an intermediate portion provided with an opening for clearing the saw blade of said table, and a second end portion; and a key element rotatably and longitudinally slidably supported within said second end portion of said bar member, said key element having an extending tab portion for engaging an index groove in a workpiece for positioning said workpiece along said bar member for forming a parallel groove in said workpiece at a predetermined distance from said index groove; the tab portion of said key element in response to rotation of said key element upon said bar member being angularly adjustable with respect to said bar member within a plane substantially parallel to a plane containing said predetermined path of movement of said bar member relative to said saw blade for the bias of said grooves, with the distance of said key element from the intermediate portion of said bar member being adjustable in response to sliding movement of said key element along said bar member and being directly related to the distance between a formed groove from its index groove; said key element being adapted to engage a groove thus formed as an index groove to form another parallel and equally spaced groove.

References Cited in the file of this patent

UNITED STATES PATENTS

| | | |
|---|---|---|
| 438,029 | Strahl | Oct. 7, 1890 |
| 1,713,329 | Clayton | May 14, 1929 |
| 2,502,124 | Bray | Mar. 28, 1950 |
| 2,696,854 | Woodruff | Dec. 14, 1954 |